United States Patent [19]
Cassat

[11] Patent Number: 4,992,710
[45] Date of Patent: Feb. 12, 1991

[54] POSITION DETECTION FOR A BRUSHLESS DC MOTOR WITH SAMPLE TIME OPTIMIZATION

[75] Inventor: Alain M. Cassat, Pully, Switzerland

[73] Assignee: Seagate Technology, Inc., Scotts Valley, Calif.

[21] Appl. No.: 546,514

[22] Filed: Jun. 29, 1990

Related U.S. Application Data

[63] Continuation-in-part of Ser. No. 413,311, Sep. 27, 1989.

[51] Int. Cl.[5] .................................... H02K 29/00
[52] U.S. Cl. .................................... 318/254; 318/138
[58] Field of Search ............... 318/138, 254, 430, 431, 318/439

[56] References Cited

U.S. PATENT DOCUMENTS

| | | | |
|---|---|---|---|
| 4,673,849 | 6/1987 | Sears et al. ...................... | 318/138 X |
| 4,678,973 | 7/1987 | Elliott et al. ...................... | 318/254 |
| 4,752,724 | 6/1988 | Radziwill et al. ............... | 318/138 X |
| 4,876,491 | 10/1989 | Squires .................................. | 318/254 |
| 4,879,498 | 11/1989 | Shinohara et al. .............. | 318/138 X |

OTHER PUBLICATIONS

P. P. Acarnley et al., "*Detection of Rotor Position in Stepping and Switched Motors by Monitoring of Current Waveforms*", IEEE Transactions on Industrial Electronics, vol. IE-32, No. 3, Aug. 1985.

*Primary Examiner*—Bentsu Ro
*Attorney, Agent, or Firm*—Flehr, Hohbach, Test, Albritton & Herbert

[57] ABSTRACT

The present method and apparatus detects the position with an accuracy of $\pi/m$ electrical radians (where m = the number of motor phases) within one electrical period, and provides enough information to be able to start in the correct direction with certainty. After starting the motor in an open loop mode of one or two steps, starting the rotor in the correct direction, the closed loop mode may be switched on, using a dynamic indirect position detection as is already well known in the technology.

More specifically, the position at start is determined by the injection of short current pulses in different motor phases, each phase or pair of phases being energized first by a pulse of one polarity and of the opposite polarity. The sign of the difference between the induced voltages is detected. By performing a succession of these tests on different phases or pairs of phases of the standing motor, a table of results is established which clearly defines the position of the rotor relative to the motor phases. The same table then defines what polarity currents should be applied to each phase to reliably and certainly start the motor in the proper direction. The present invention includes a method and apparatus for optimizing the duration of the short current pulses used in determining the rotational position of the rotor.

41 Claims, 13 Drawing Sheets

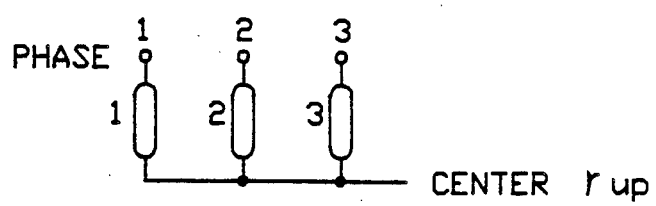
FIG.—17A
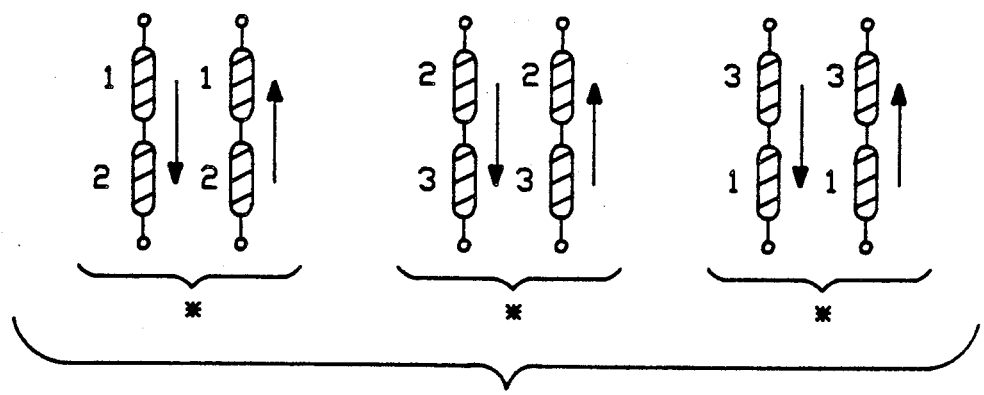
FIG.—17B
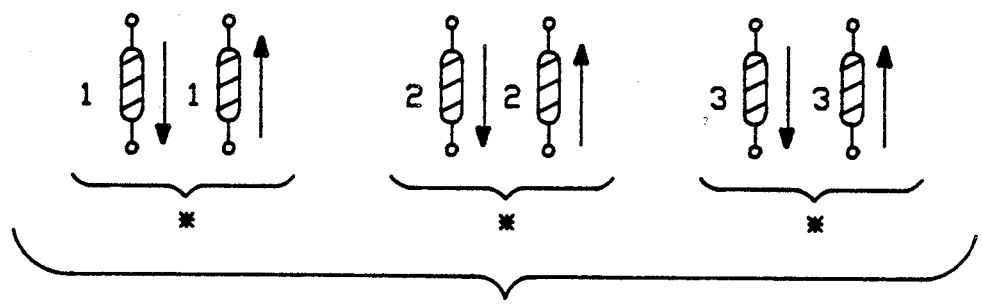
FIG.—17C
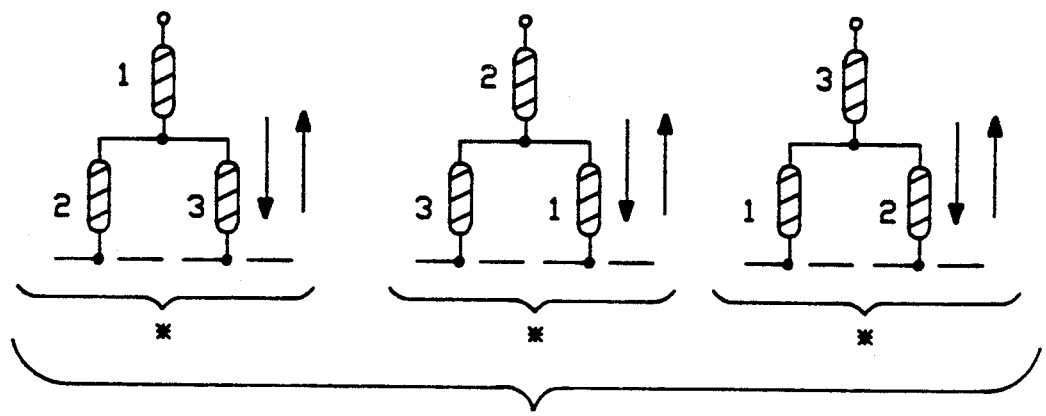
FIG.—17D

POSITION DETECTION FOR A BRUSHLESS DC MOTOR WITH SAMPLE TIME OPTIMIZATION

CROSS-REFERENCE TO A RELATED APPLICATION

The present invention is useful in a motor such as shown in U.S. Pat. No. 4,858,044. The present application is a continuation-in-part of U.S. application, Ser. No. 413,311, filed Sept. 27, 1989.

FIELD OF THE INVENTION

The present invention relates to method and apparatus for use with a brushless DC motor which provide the capability of detecting the rotor position when the motor is stopped without the use of known rotor position detecting elements such as Hall elements. The method presented here applies to any type of motor having an excitation flux created by a permanent magnet or by DC current excitation of a winding.

BACKGROUND OF THE INVENTION

Briefly stated, a brushless motor is a motor in which the positions of magnetic poles of a rotor are detected by means of a detector directly coupled to the shaft of the rotor. In response to the detected position, semiconductor switching elements such as transistors, thyristors or the like are turn on and off so as to continuously generate torque in the motor. Field windings or a multi-segment permanent magnet are used for the rotor.

The torque is created by application of currents to stator or field windings in sequential order to produce a torque-inducing flux for moving a rotor. The DC currents are alternately switched about the field windings to create various current paths that produce magnetic flux orientations in a synchronized fashion. The magnetic flux so produced results in a torque on the motor that causes the desired rotational movement In order to ensure that current is applied to the proper motor phase, sensing devices are used to provide information about the position of the rotor. Typically, this information is derived through systems such as Hall sensors, optical sensors or resolvers. These different systems do not give an absolute position, but provide enough information to know the relative position of the rotor in one electrical period. Therefore, it is possible using these devices to energize the motor in such a way that it starts in every case in the correct direction.

Of the known position detection systems, the best known and most commonly used, especially in motors where economy and small size are of significant importance, are Hall sensors. However, the position of the Hall elements must be very precisely fixed. Further, the heat resisting temperature of a Hall element is limited, so that deterioration of the characteristics of the motor can occur if the motor is heavily loaded. Another problem with these sensing device is that they are prone to failure. Thus, the Hall devices significantly affect the overall reliability of the apparatus that incorporates them. Also, incorporating these sensing devices in the motor structure itself increases the motor size, cost, complexity, and power consumption. A number of wire leads must also be provided to each Hall effect device to bring out the information detected by the Hall device to a microprocessor or the like external to the motor shell.

A number of different solutions to indirect position detection which do not require sensors have been developed. For example, methods disclosed to date include: direct or indirect back EMF detection, as disclosed in V. D. Hair, "Direct Detection of Back EMF in Permanent Magnet Step Motors," Incremental Motion Control Systems and Devices Symposium, Urbana-Champaign, 1983, pp. 219-221, and K. M. King, "Stepping Motor Control", U.S. Pat. No. 4,136,308, Jan. 23, 1979; a current analysis, as disclosed in B. C. Kuo, A. Cassat, "On Current Detection in Variable-Reluctance Step Motors," Incremental Motion Control Systems and Devices, 6th Annual Symposium, Urbana-Champaign, 1977, pp. 205-220; and two third harmonic analyses, as disclosed in P. Ferraris, A. Vagati, F. Villata, "PM Brushless Motor: Self Commutating Prerogatives with Magnetically Anisotropic Rotor," Instituto di Elettriche, Politecnico di Torino, Italia, and R. Osseni, "Modélisation et Auto-Commutation des Moteurs Synchrones," EPFL No. 767, 1989. However, these methods do not provide any information about the position of the rotor at standstill. If the electrical drive system has been switched off and the rotor is not turning, it is not possible to know the rotor's actual position as related to the stator phases. Thus, at switch on, the motor may start in either the correct or incorrect direction. This may not matter for some applications, but in many applications, such as in driving the spindle motor in a disc drive, an incorrect starting direction is not acceptable.

One known effort to determine the starting position without the use of sensors is disclosed in U.S. Pat. No. 4,876,491. According to this method, a short current pulse is applied to each power phase of the motor, and the resulting motor current is measured to determine the positional information of the rotor based on the return pulse of greatest amplitude. However, the difference between the pulses returned from the different phases may be very small, and may be affected by temperature, noise, or differences between the phase inductances or phase resistances. Also, it is possible that the returned pulses may all be of equal amplitude and render a position measurement impossible.

SUMMARY OF THE INVENTION

The present method and apparatus detects the position with an accuracy of $\pi/m$ electrical radians (where m = the number of motor phases) within one electrical period, and provides enough information to start the motor in the correct direction with certainty. After starting the motor in the correct direction in an open loop mode, the closed loop mode may be switched on, using a dynamic indirect position detection as is already well known in the technology.

More specifically, the position at start is determined by the injection of short current pulses in different motor phases, each phase or pair of phases being energized first by a pulse of one polarity and then by a pulse of the opposite polarity. The sign of the current difference of the pulses injected in the same phase or pair of phases is detected. By performing a succession of these tests on different phases or pairs of phases of the standing motor, a table of results is established which clearly defines the position of the rotor relative to the motor phases. The same table then defines what polarity currents should be applied to each phase to reliably and certainly start the motor in the proper direction.

This method, in effect, indirectly detects the saturation level of the different motor phases. By using this approach, the measurement is made in such a way that the influence of the temperature on the electrical time constants and the different possible variations in winding parameters do not effect the final detection of the rotor position. This method assures starting in the correct direction, and without back oscillation.

The present invention incorporates a method and apparatus to determine the optimal duration of the applied current pulse. It is required that the method use measurement pulses which are short enough that rotation of the rotor as coupled to a load is not produced, but long enough to facilitate accurate measurement of the current differences. This improvement determines the optimal measurement pulse length which satisfies this criteria.

Other features and advantages of the present invention may become apparent to a person who studies the following disclosure given with respect to the accompanying figures.

BRIEF DESCRIPTION OF THE DRAWINGS

FIGS. 17A-17D illustrate the various phase combinations possible in a three-phase motor.

DETAILED DESCRIPTION OF A PREFERRED EMBODIMENT

Any polarized motor, such as a brushless DC motor, including permanent magnets or excitation windings, has a local stator and rotor saturation level. As a result of the saturation level of the iron magnetic circuit, phase inductances are a function of rotor position. The approach taken in the present invention is to measure the saturation level of the phase flux versus the current in a phase for each corresponding phase in such a way that the following parameters cannot influence measurement accuracy:

temperature effect on resistance in the phase;

the relatively small differences between the inductances created in the magnetic circuits;

where a relatively high frequency is used to measure the inductance, secondary effects such as eddy currents.

The method disclosed below and the apparatus used to implement it provide a reliable and efficient approach to determining the starting position for a motor, particularly a small power motor.

In the magnetic circuit of a motor phase winding, with current, two effects are superimposed: (1) the permanent magnet flux (or the DC current excitation winding flux); and (2) the current flux. The total flux in a given phase can be expressed as follows:

$$\Psi_{phase} = \Psi_{PM} + L \cdot i$$

Where:

$\Psi_{phase}$ = total flux in the phase $\Psi_{PM}$ = total flux created by the excitation (permanent magnet or DC current excitation) in the corresponding phase L = inductance of the phase; L is a function of the current i and the motor rotor position $\alpha$ i = current in the phase Consequently, the total flux $\Psi$ phase can be increased or decreased by the current effect, thus modifying the saturation level.

If $\Psi_{phase} > \Psi_{PM}$, the magnetic circuit is more saturated due to the additional effect of the current i+, and the corresponding inductance can be written as:

$$L = L_o - \Delta L^+ \qquad [2]$$

Where:

$L_o$ = inductance of the phase when current equals zero $\Delta L^+$ = incremental change in inductance when current is different from zero (i+)

i+ = current in the phase, the current creates a positive flux (same flux direction as $\Psi_{PM}$)

On the other hand, if $\Psi_{phase} < \Psi_{PM}$, the magnetic circuit is less saturated due to the subtracting effect of the current i−, and the inductance can be written as follows:

$$L = L_o + \Delta L^- \qquad [3]$$

Where:

$\Delta L^-$ = incremental change in inductance when current is different from zero (i−)

i− = current in the phase, the current creates a negative flux (opposite direction as $\Psi_{PM}$)

Figure 1:
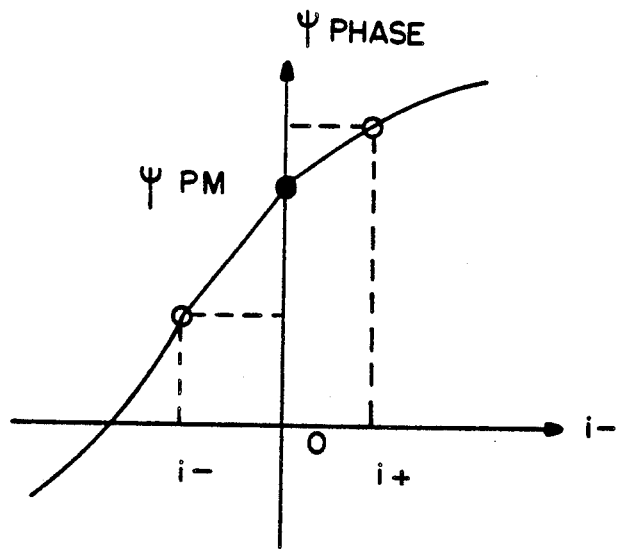
FIG. 1 illustrates phase flux versus current in a phase of a brushless DC motor.

FIG. 1 represents the two possible cases for a given position when motor is in a standstill state.

Current $i^+$ and current $i^-$ are of opposite direction, consequently of opposite sign, and $L=L(i)$.

Instead of directly measuring the inductance, the idea is to analyze the current evolution. At standstill, the phase current can be generally written as:

$$i = \frac{U}{R}\left(1 - e^{-\frac{R}{L} \cdot t}\right) \quad [4]$$

Where:
U = applied voltage to the phase
R = total resistance of the phase
t = time
i = current in the phase Applying equation [4] to the two cases, the current is expressed as follows (see FIG. 2):

$$i^+ = \frac{U}{R}\left(1 - e^{\frac{-R \cdot t}{L_0 - \Delta L^+}}\right) \quad [5]$$

$$i^- = \frac{U}{R}\left(1 - e^{\frac{-R \cdot t}{L_0 + \Delta L^-}}\right) \quad [6]$$

Figure 2:
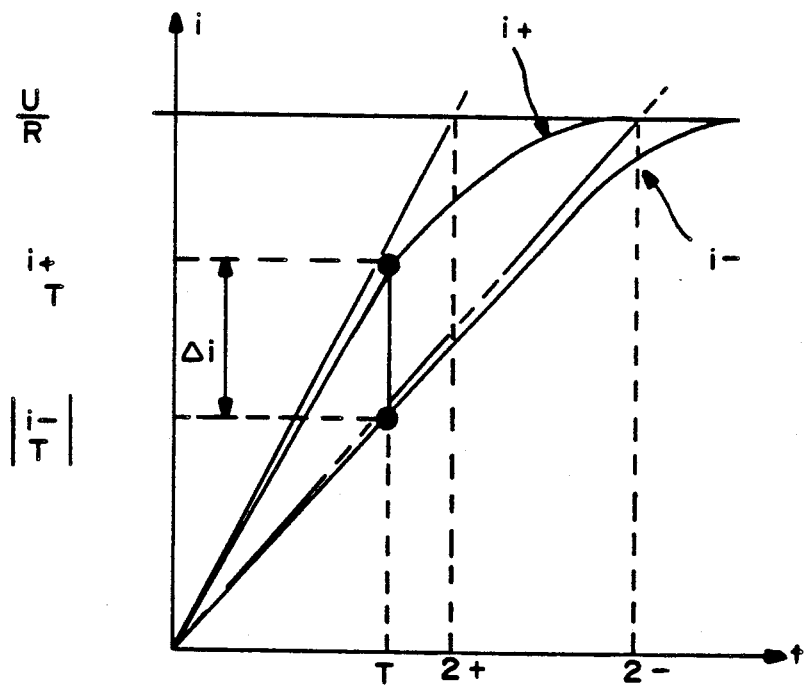
FIG. 2 illustrates current rise versus time in a brushless DC motor.

FIG. 2 shows the two different currents, where current $i^-$ is represented by its absolute value.

Defining a fixed measuring time T, approximately equal to the time constant, it is possible to compare the current amplitudes and mainly the difference of the two current amplitudes. Alternatively, it is possible to measure the difference in rise time of the current pulses and obtain the desired position location information, as disclosed in "Position Detection For a Brushless DC Motor Without Hall Effect Devices Using a Time Differential Method" by John Dunfield, Attorney Docket No. A-52500. The following sample time optimization technique is useful for either method of rotor position location. Focusing on the current amplitude difference method, the difference of the two currents is equal to:

$$\Delta i = i^+ - |i^-| \quad [7]$$

$$\Delta i = \frac{U}{R}\left(e^{\frac{-R \cdot T}{L_0 + \Delta L^-}} - e^{\frac{-R \cdot T}{L_0 - \Delta L^+}}\right)$$

The sign of the current difference $\Delta i$ is a characteristic of the current effect superimposed on the excitation flux $\Psi_{PM}$ effect. Three cases have to be considered:

Case 1: $\Delta i > 0$

If $\Delta i$ is greater than zero, it means that the current $i^+$ creates a flux of the same direction as the excitation flux created by the permanent-magnet (or the DC current excitation winding flux). The current $i^-$ creates a flux of opposite direction to the excitation flux.

Case 2: $\Delta i < 0$

If $\Delta i$ is negative, it means that the current $i^+$ creates a flux of opposite direction to the excitation flux. The current $i^-$ creates a flux of the same direction as the excitation flux.

Case 3: $\Delta i = 0$

This case corresponds to a situation where $\Delta L^+ = \Delta L^- \approx 0$ corresponding to a very low saturation level in the corresponding phase.

Consequently, it is possible based on the determination of the sign of the current difference $\Delta i$ to determine the direction of the excitation flux and consequently the motor position at standstill. This position is given with an accuracy of $\pi$ electrical radians for the corresponding phase.

Figure 3:
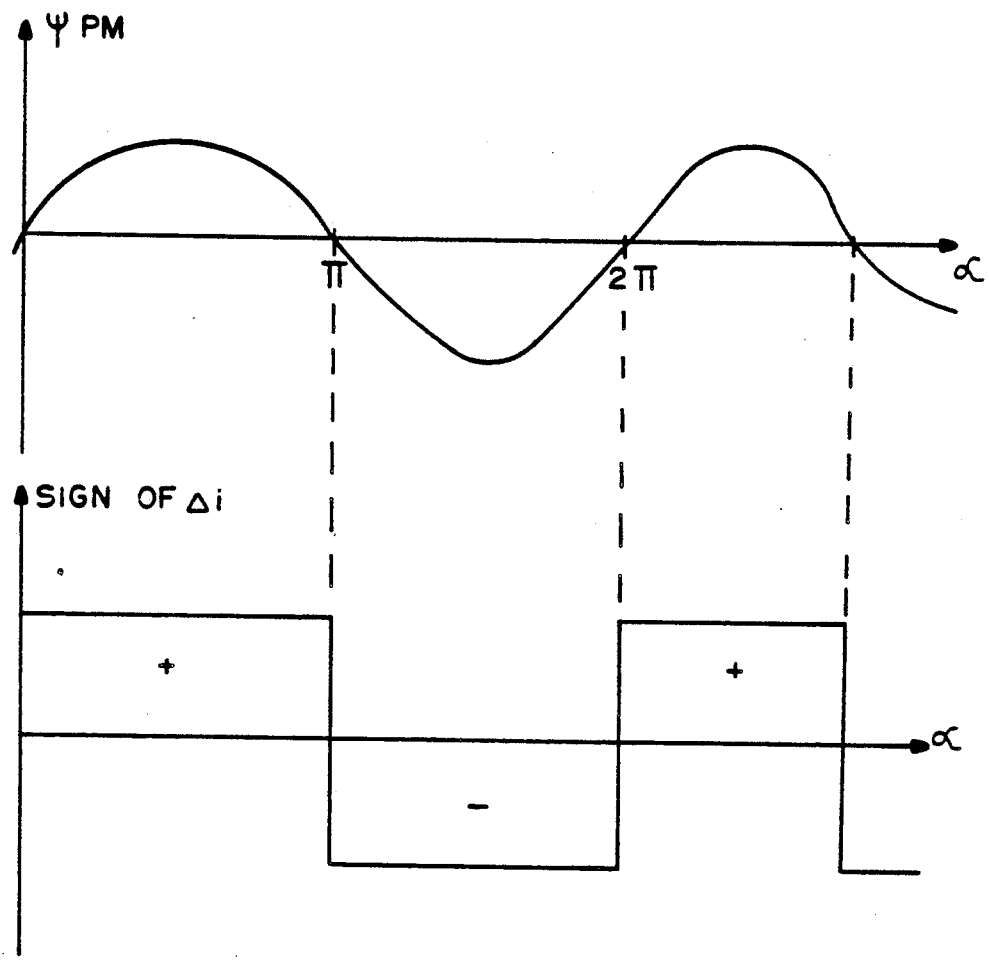
FIG. 3 illustrates the correlation between excitation flux and current difference in a given motor phase versus motor position.

FIG. 3 shows the correlation between the excitation flux $\Psi_{PM}$ and the sign of the current difference $\Delta i$ versus the motor position (motor at standstill).

In a motor having m phases, such a measurement of the sign of the current difference $\Delta i$ can be determined for each phase. The corresponding determination of the motor position is therefore established with an accuracy of $\pi/m$ electrical radians. That is, the accuracy with which rotor position is determined is greater where a sequence of the different phases of the motor are excited at standstill.

Figure 4:
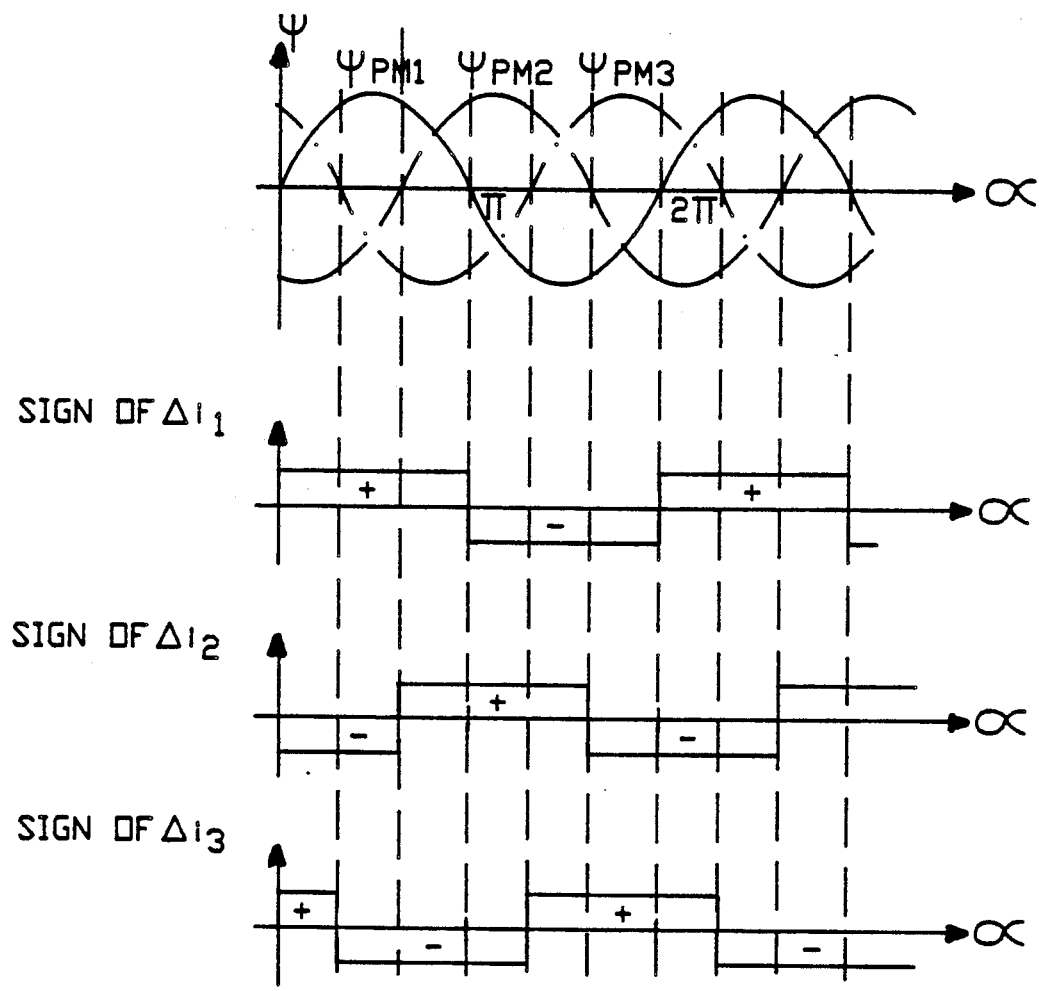
FIG. 4 illustrates the correlation between the different excitation flux and corresponding motor current differences for a three-phase motor.

For example, for a three-phase motor, the excitation flux created by the permanent magnet (or the DC current excitation winding) are shifted from one phase to the other by $2\pi/m$ electrical radians (m=3). The measurements of the current difference $\Delta i$ in each phase permits determining the rotor position with an accuracy of 60 electrical degrees. FIG. 4 shows such a configuration, and the correlation between the different excitation flux $\gamma_{PM}$ and the corresponding current differences $\Delta i$, for a three-phase motor. In that figure, the following symbols have been adopted:

$\alpha$ = motor rotor position in electrical degree
$\Psi_{PM1}$ = excitation flux in phase 1
$\Psi_{PM2}$ = excitation flux in phase 2
$\Psi_{PM3}$ = excitation flux in phase 3
$\Delta i_1$ = current difference in phase 1
$\Delta i_2$ = current difference in phase 2
$\Delta i_3$ = current difference in phase 3

Consequently, there is a unique distribution of the signs of the different current differences and the motor rotor position over one electrical period of the excitation flux. By exciting the phases of the motor and defining a table of the signs of the current differences, the rotor position can be uniquely and accurately established.

To establish the optimum sample duration T, both the optimum duration to produce maximum sensitivity and the optimum duration to produce the maximum current difference must be considered. The sensitivity is defined as:

$$S\Delta i = \frac{\Delta i}{|i^-|} \quad [8]$$

Substituting Equations [6] and [7] into Equation [8]:

$$S\Delta i = \frac{e^{\frac{-T}{\tau^-}} - e^{\frac{-T}{\tau^+}}}{1 - e^{\frac{-T}{\tau^-}}} \quad [9]$$

Where:

$$\tau^+ = \frac{L_0 - \Delta L^+}{R}$$

$$\tau^- = \frac{L_0 + \Delta L^-}{R}$$

The point at which the derivative of the sensitivity equation [9] equals zero will provide the value of T for the optimum sensitivity. Thus:

$$\frac{d}{dT}(S\Delta i) = \qquad [10]$$

$$\frac{\frac{-1}{\tau^-}e^{\frac{-T}{\tau^-}} + \frac{1}{\tau^+}e^{\frac{-T}{\tau^+}}}{1 - e^{\frac{-T}{\tau^-}}} \cdot \frac{e^{\frac{-T}{\tau^-}} - e^{\frac{-T}{\tau^+}}}{\left(1 - e^{\frac{-T}{\tau^-}}\right)^2}\left(\frac{1}{\tau^-}e^{\frac{-T}{\tau^-}}\right)$$

Equating [10] to zero, simplifying, and rearranging provides:

$$\frac{\tau^-}{\tau^+} = \frac{e^{\frac{-T}{\tau^-}}\left(1 - e^{\frac{-T}{\tau^+}}\right)}{e^{\frac{-T}{\tau^+}}\left(1 - e^{\frac{-T}{\tau^-}}\right)} \qquad [11]$$

The singular solution of equation [11] determines the optimum value of T as $T=T_o=0$. Thus, the optimum sensitivity is obtained for $T=0$. Using this discovery in equation [9] determines the optimum sensitivity:

$$T \xrightarrow{\lim} 0 \; S\Delta i = \frac{\tau^-}{\tau^+} - 1 \qquad [12]$$

Figure 5:
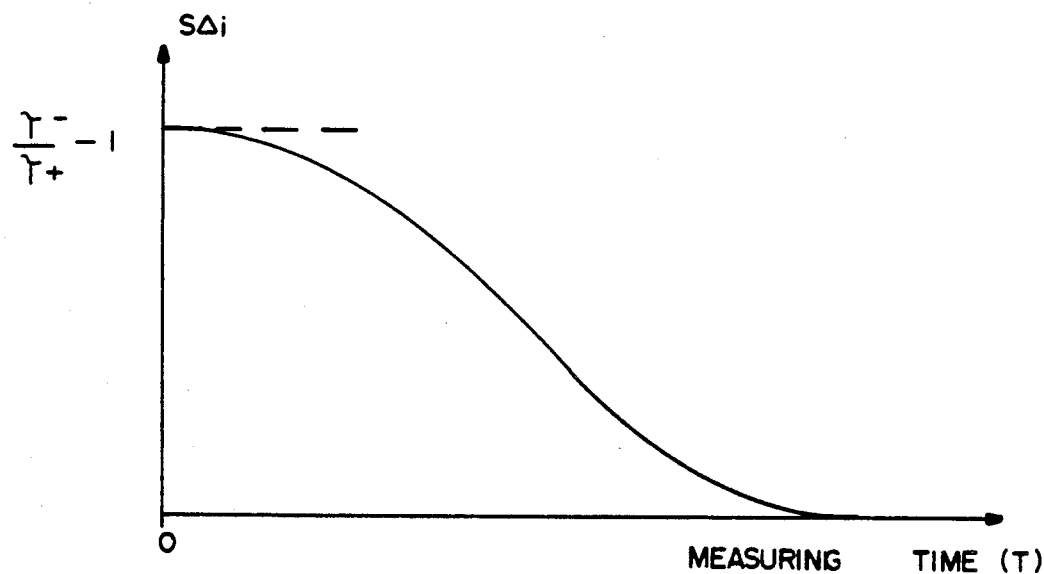
FIG. 5 is a graph of the current difference method sensitivity versus the measuring time.

It can also be shown that as $T \to \infty$ the function of equation [9] will approach zero. Consequently, the sensitivity $S\Delta i$ is a decreasing function having an optimum at $T=0$, as is shown in FIG. 5.

To complete the analysis determining the optimal sampling time T, the maximum current difference must be determined. Accordingly, the derivative of equation [7] is taken, such that:

$$\frac{d\Delta i}{dT} = \frac{U}{R}\left(\frac{-1}{\tau^-}e^{\frac{-T}{\tau^-}} + \frac{1}{\tau^+}e^{\frac{-T}{\tau^+}}\right) \qquad [13]$$

Where:

$$\tau^+ = \frac{L_0 - \Delta L^+}{R}$$

$$\tau^- = \frac{L_0 + \Delta L^-}{R}$$

The maximum value of the current difference occurs at the point where the derivative becomes zero. Thus, equation [13] is equated to zero and is solved for the value of T at the inflection point, designated $T_1$. Accordingly, the value of $T_1$ is:

$$T_1 = \frac{\tau^+ \cdot \tau^-}{\tau^- - \tau^+} \ln \frac{\tau^-}{\tau^+} \qquad [14]$$

Figure 6:
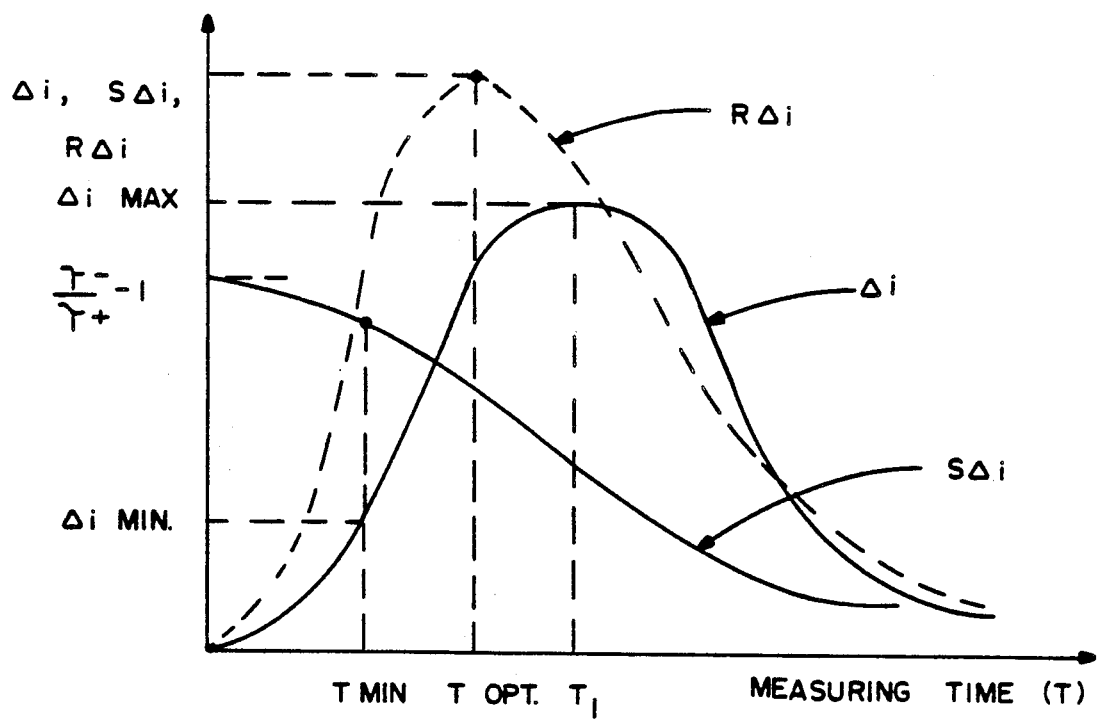
FIG 6 is a graph of the current difference sensitivity, current difference and current difference method figure of merit versus the measuring time.

The current difference function is plotted in FIG. 6 in conjunction with the sensitivity function of FIG. 5. The value $\Delta i_{min}$ is defined by the minimum current difference that is measurable by the implementing circuitry. From FIG. 6, it is clear that an optimal T falls between the terms $T_{min}$ and $T_1$, where both the current difference and the sensitivity are large.

To precisely define the optimum value of T, both functions derived above are used to formulate a figure of merit $R\Delta i$. The $\Delta i$ function in equation [7] must be divided by a nominal current value $I_N$ insuring that the function $\Delta i$ is purely a function of the time constants $\tau^-$, $\tau^+$ and the measuring time T. The figure of merit $R\Delta i$ is determined by the following:

$$R\Delta i = \frac{\Delta i}{I_N} \cdot S\Delta i \qquad [15]$$

where:

$$I_N = \frac{U}{R}$$

The figure of merit $R\Delta i$ is at a maximum at the optimum measuring time $T_{opt}$. FIG. 6 depicts the figure of merit function.

Another way to measure indirect saturation detection is current integration. Instead of measuring the current difference, some electronic advantages are gained by measuring the difference of the current integration.

The integration of the current is defined as follows:

$$\int_O^T i^+ \, dt = \int_O^T \frac{U}{R}\left(1 - e^{\frac{-R \cdot t}{L_0 - \Delta L^+}}\right) \cdot dt \qquad [16]$$

$$\int_O^T i^- \, dt = \int_O^T \frac{U}{R}\left(1 - e^{\frac{-R \cdot t}{L_0 + \Delta L^-}}\right) \cdot dt \qquad [17]$$

The difference in the current integration is given by:

$$\Delta ii = \int_O^T i^+ \cdot dt - \int_O^T |i^-| \cdot dt \qquad [18]$$

A decision on rotor position can be made based on the difference in the current integration $\Delta ii$ rather than the difference in the current $\Delta i$.

Consequently, this approach provides the same result and the same rotor position determination accuracy, $\pi/m$ electrical radian, as the previously discussed current difference methods.

Figure 7:
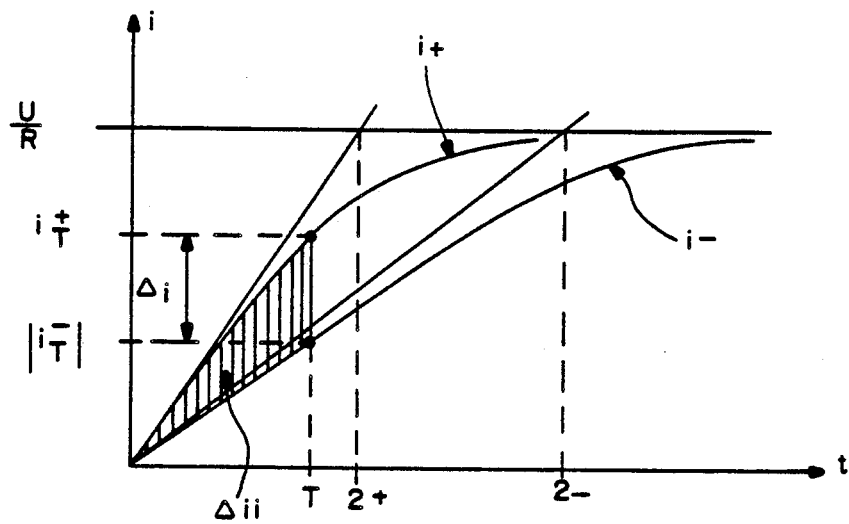
FIG. 7 illustrates the difference which it can be detected by integration of the resulting phase current.

FIG. 7 shows the corresponding currents and the difference of the current integration $\Delta ii$. This figure illustrates that integration emphasizes the difference between the flux induced by the currents of opposite direction, and thereby enhances the noise immunity of the method.

The enhanced results can be shown mathematically by accomplishing a sensitivity analysis. The sensitivity of the difference of the current integration is defined as:

$$S\Delta ii = \frac{\Delta ii}{\int_O^T |i^-|} \, dt \qquad [19]$$

Substituting equations [16], [17], and [18] into equation [19] and reducing, results in the following expression for the sensitivity S$\Delta$ii:

$$S\Delta ii = \frac{\tau^+ \left(e^{\frac{-T}{\tau^+}} - 1\right) - \tau^- \left(e^{\frac{-T}{\tau^-}} - 1\right)}{T + \tau^- \left(e^{\frac{-T}{\tau^-}} - 1\right)} \quad [20]$$

To determine the optimum value of the sensitivity, the derivative of S$\Delta$ii with respect to the sample time T is taken and is equated to zero. The reduced result is the following expression:

$$\frac{d}{dt}(S\Delta ii) = 0 \rightarrow \frac{-e^{\frac{-T}{\tau^+}} + e^{\frac{-T}{\tau^-}}}{1 - e^{\frac{-T}{\tau^-}}} - \quad [21]$$

$$\frac{\tau^+ \left(e^{\frac{-T}{\tau^+}} - 1\right) - \tau^- \left(e^{\frac{-T}{\tau^-}} - 1\right)}{T + \tau^- \left(e^{\frac{-T}{\tau^-}} - 1\right)} = 0$$

In comparing equation [21] to equations [9] and [20], it is seen that the derivative of S$\Delta$ii is equal to the difference of S$\Delta$i and S$\Delta$ii. Thus:

$$S\Delta i - S\Delta ii = 0.$$

Consequently, the optimum sensitivity for the current difference method and the current integration method must be equal.

To complete the optimization analysis for the current integration technique, the maximum difference between the current integrals must be determined. After integrating equations [16] and [17] and subtracting the results, it is obvious that $\Delta ii$ approaches a maximum value as T approaches infinity. The maximum is:

$$\lim_{T \to \infty} \Delta ii = \Delta ii_{max} = \frac{U}{R}(\tau^- - \tau^+) \quad [22]$$

Figure 8:
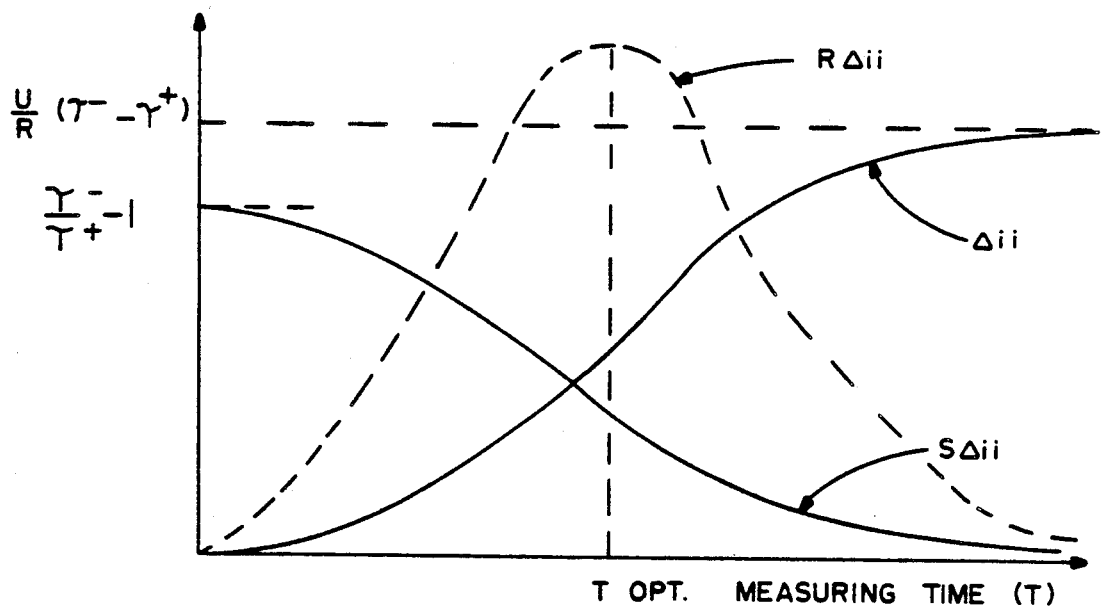
FIG. 8 is a graph of the current integration method sensitivity, integrated current difference, and current integration method figure of merit versus the measuring time.

FIG. 8 depicts the functions of $\Delta ii$ and S$\Delta$ii versus the measuring time T. To determine the optimum value of the measuring time T a figure of merit function R$\Delta$ii is necessary. R$\Delta$ii is determined by first dividing the difference of the current integration $\Delta ii$ by a nominal value:

$$\Delta ii_R = \frac{\Delta ii}{\int_0^T I_N \cdot dt} = \frac{\Delta ii}{I_N \cdot T} \quad [23]$$

The figure of merit is defined as:

$$R\Delta ii = \Delta ii_R \cdot S\Delta ii \quad [24]$$

The figure of merit function is depicted in FIG. 8. Its maximum connotes the optimum measuring time $T_{opt}$.

A comparison between the sensitivity functions of the current difference method and the difference of the current integration method will prove which is more sensitive. Equation [20] can be expressed as a ratio as follows:

$$S\Delta ii = \frac{N}{D} \quad [25]$$

Where:

$$N = \tau^+ (e^{\frac{-T}{\tau^+}} - 1) - \tau^- (e^{\frac{-T}{\tau^-}} - 1) \quad [26]$$

$$D = T + \tau^- (e^{\frac{-T}{\tau^-}} - 1) \quad [27]$$

The derivatives of N and D with respect to the measuring time T are:

$$\frac{dN}{dT} = -e^{\frac{-T}{\tau^+}} + e^{\frac{-T}{\tau^-}} \quad [28]$$

$$\frac{dD}{dT} = 1 - e^{\frac{-T}{\tau^-}} \quad [29]$$

Equation [9] can be represented by equations [28] and [29] as:

$$S\Delta i = \frac{dN}{dD} \quad [30]$$

Additionally, the derivative of S$\Delta$ii can be expressed as:

$$\frac{dS\Delta ii}{dT} = \frac{dN \cdot D - N \cdot dD}{D^2} = \frac{dN}{D} \left(1 - \frac{N}{D} \cdot \frac{dD}{dN}\right) \quad [31]$$

Substituting equations [25] and [30] into [31] results in:

$$\frac{dS\Delta ii}{dT} = \frac{dN}{dT} \cdot \frac{1}{D} \left(1 - \frac{S\Delta ii}{S\Delta i}\right) \quad [32]$$

From the previous analysis of S$\Delta$ii, it is known that the function is positive and decreasing. Consequently:

$$\frac{dS\Delta ii}{dT} \leq 0 \quad [33]$$

Figure 9:
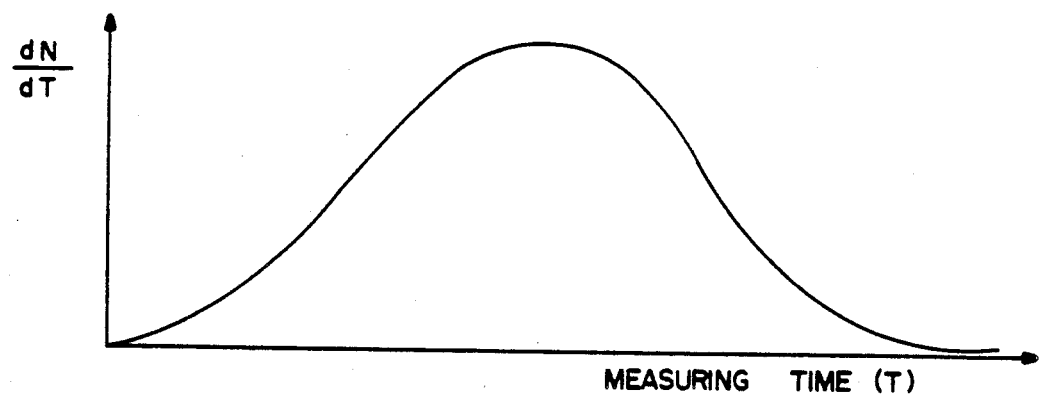
FIG. 9 is a graph representing the derivative of the numerator of the current integration method sensitivity function.
Figure 10:
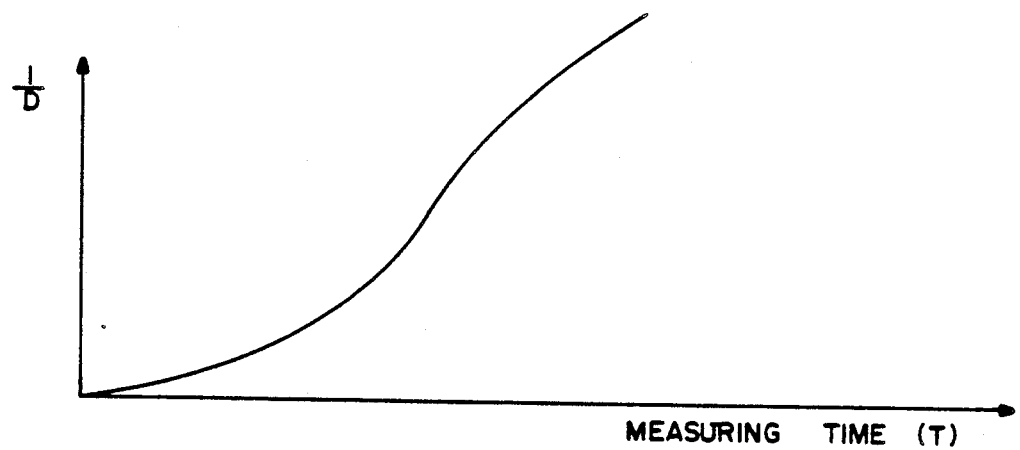
FIG. 10 is a graph representing the inverse of the denominator of the current integration method sensitivity function.

FIGS. 9 and 10 depict the functions $$\frac{dN}{dT} \text{ and } \frac{1}{D}.$$

From the graphs, it is obvious that the following is true:

$$f(t) = \frac{dN}{dT} \cdot \frac{1}{D} \geq 0. \quad [34]$$

In other words, the function f(t) is always positive.

Consequently, to satisfy equations [32], [33], and [34], the following must be true:

$$1 - \frac{S\Delta ii}{S\Delta i} \leq 0 \text{ or } S\Delta ii \geq S\Delta i \quad [35]$$

Figure 11:
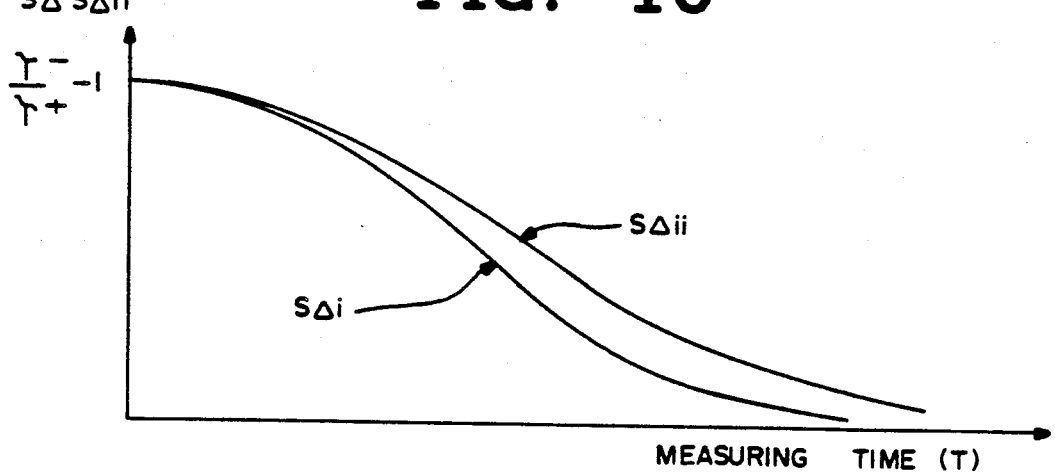
FIG. 11 is a comparative graph representing the sensitivity functions of both the current difference method and the current integration method.

Thus, it is proven that the sensitivity of the difference of the current integration method S∆ii is greater than the sensitivity of the current difference method S∆i at all points except T=0. FIG. 11 depicts this result.

Another possible way to determine the rotor position in a motor which provides the same result as the previous two methods is to determine the sign of the difference of the current derivative.

The derivative of the current is defined as follows:

$$\frac{di}{dt} = \frac{U}{L} e^{\frac{-R \cdot t}{L}} \quad [36]$$

and for the configuration under consideration:

$$\frac{di^+}{dt} = \frac{U}{Lo - \Delta L^+} e^{\frac{-R \cdot t}{Lo - \Delta L^+}} \quad [37]$$

$$\frac{di^-}{dt} = \frac{U}{Lo + \Delta L^-} e^{\frac{-R \cdot t}{Lo + \Delta L^-}} \quad [38]$$

Defining the difference of the current derivatives as follows:

$$\Delta di = \left| \frac{di^-}{dt} \right| - \frac{di^+}{dt} \quad [39]$$

at time t=T $$\Delta di = U \frac{1}{Lo + \Delta L^-} e^{\frac{-R \cdot T}{Lo + \Delta L^-}} - \frac{1}{Lo - \Delta L^+} e^{\frac{-R \cdot T}{Lo - \Delta L^+}} \quad [40]$$

The sign of ∆di permits determination of the motor position similarly to the approach defined when using the sign of the current difference ∆i.

Figure 12:
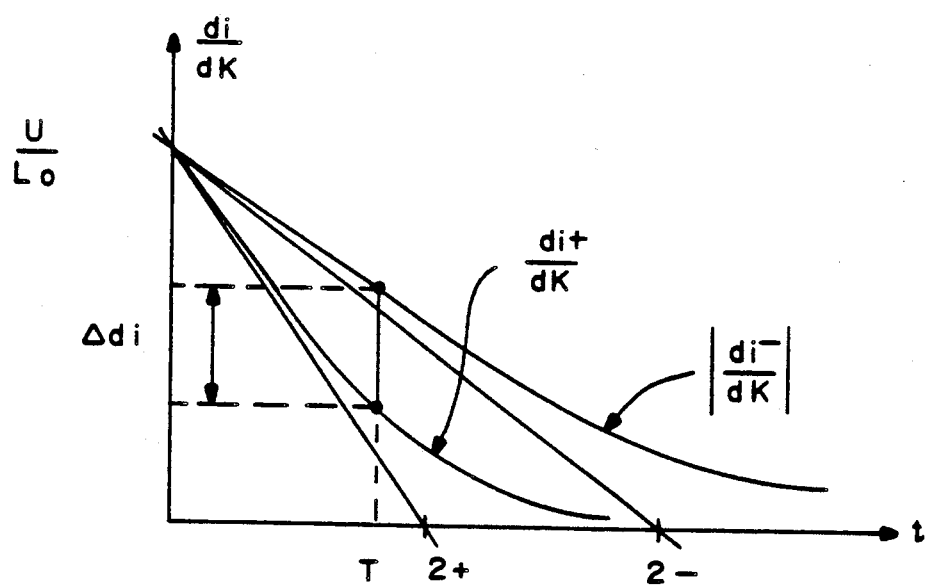
FIG. 12 illustrates the difference which can be established by differentiation of the resulting phase current.

FIG. 12 shows the corresponding derivatives of the current.

Figure 13:
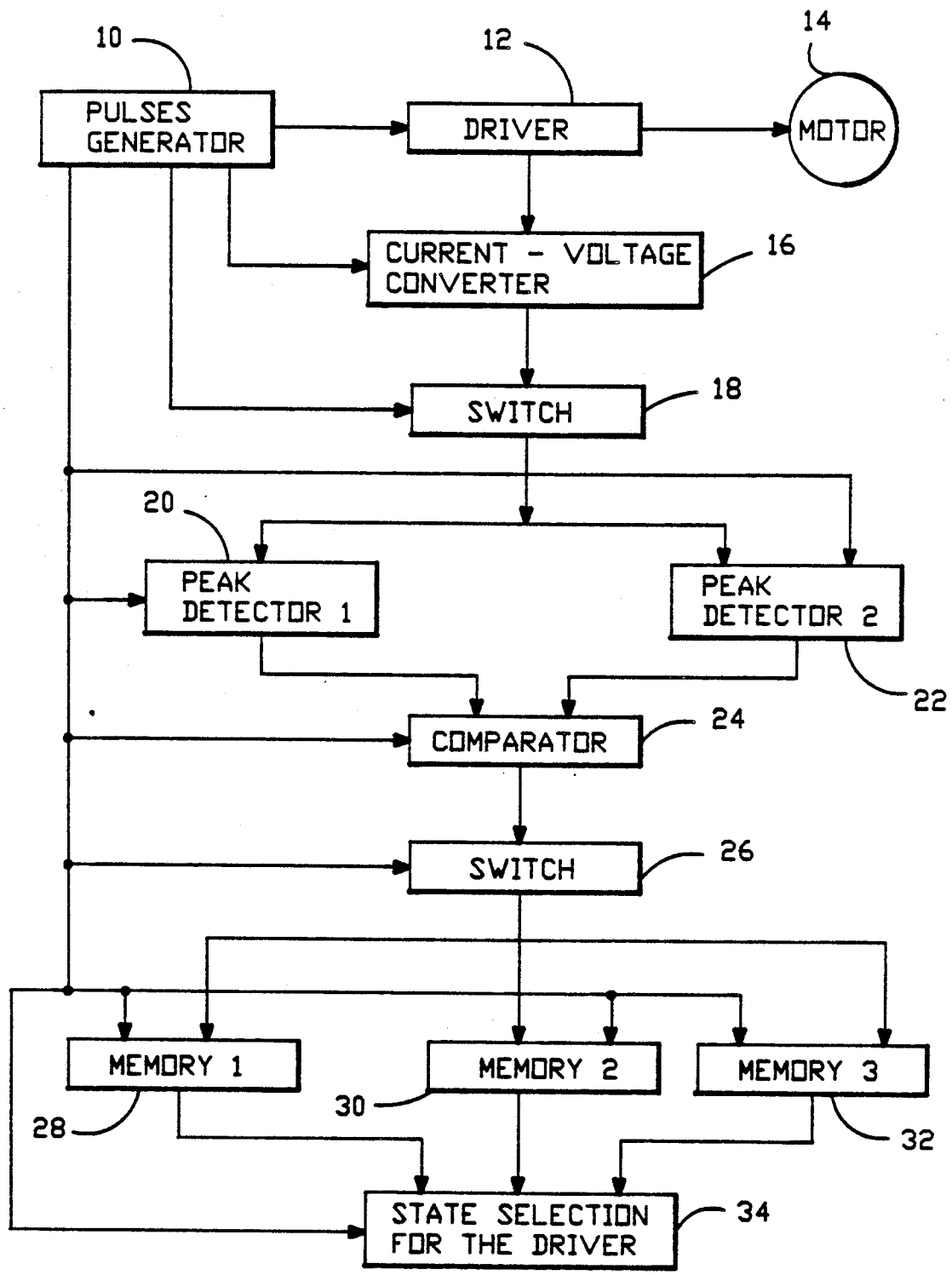
FIG. 13 is a block diagram which may be used to understand the approach to position detection according to the present invention.

An example of the process used to measure motor position at standstill using the method of the present invention is given with respect to FIG. 13 for a three-phase motor. The process as described in the apparatus and step shown are not intended to be exhaustive, but merely as an example.

According to this exemplary process, using a pulse generator 10 through a driver 12, each phase of a motor 14 is supplied first with a positive current through the driver 12. The resulting current is converted to a voltage through a current to voltage converter 16. Each phase is supplied the current for a time T. The final value of the current, after time T, is stored by use of a switch 18 in a peak detector 20.

Most simply, the measuring time T is preselected using the optimal time determination equations derived above. The time T would be fixed at the time of manufacture based upon measurements of the phase time constants, $\tau^+$ and $\tau^-$, and T would be constant for the life of the motor. However, a microprocessor can be utilized to allow the measuring time T to be optimized during each motor startup. Since T is a function of the time constant, $\tau^-$ and $\tau^+$, of the coils, any variation in time constant characteristics are of prime concern. Thus, a self learning process may engender a longer life expectancy by adapting to motor parameter variations. Additionally, the self-learning process enables a single rotor position detection system to adapt itself to a variety of motor types.

Figure 14A:
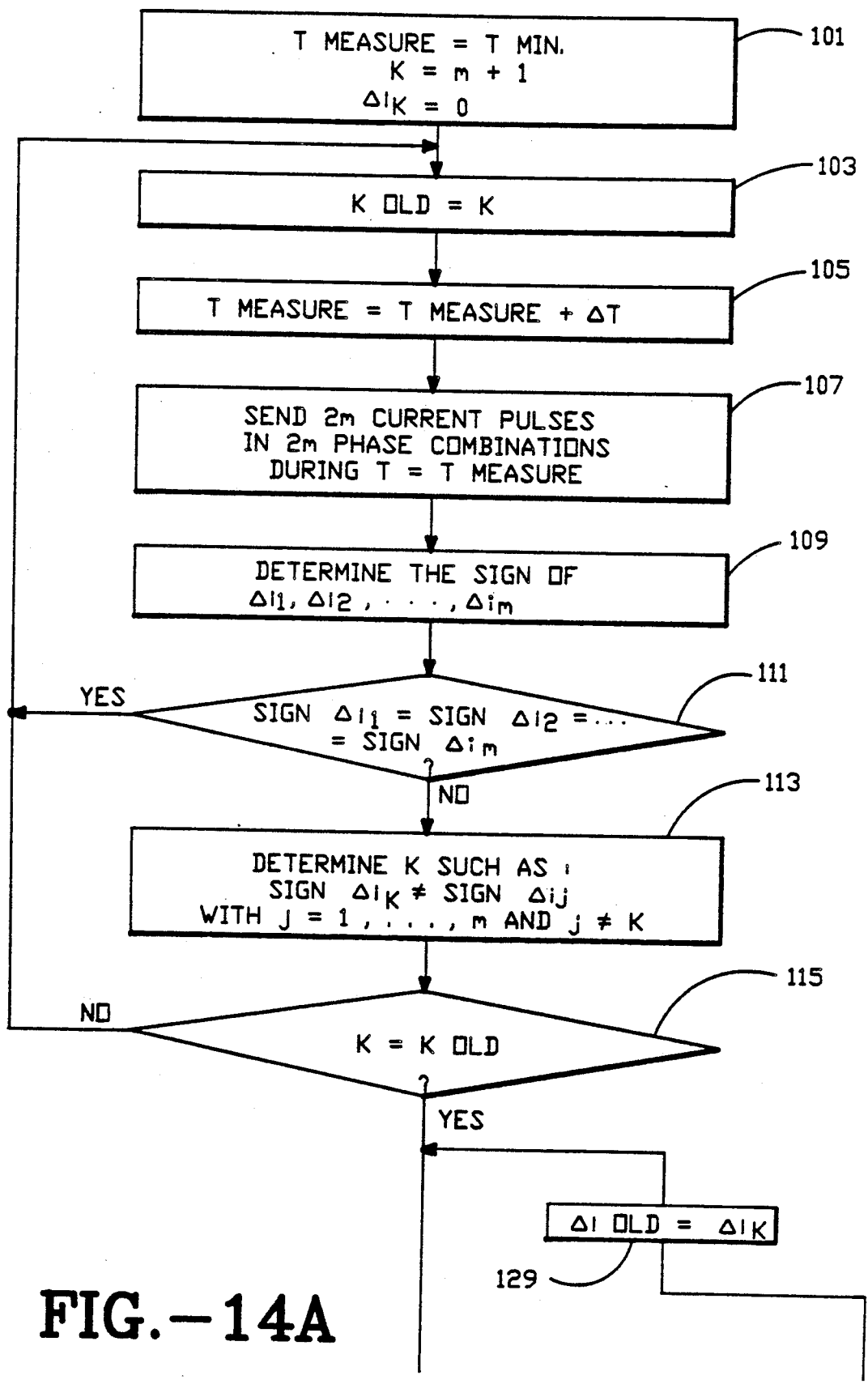
FIGS. 14A and 14B show a flow chart of the method used to optimize the measuring time.
Figure 14B:
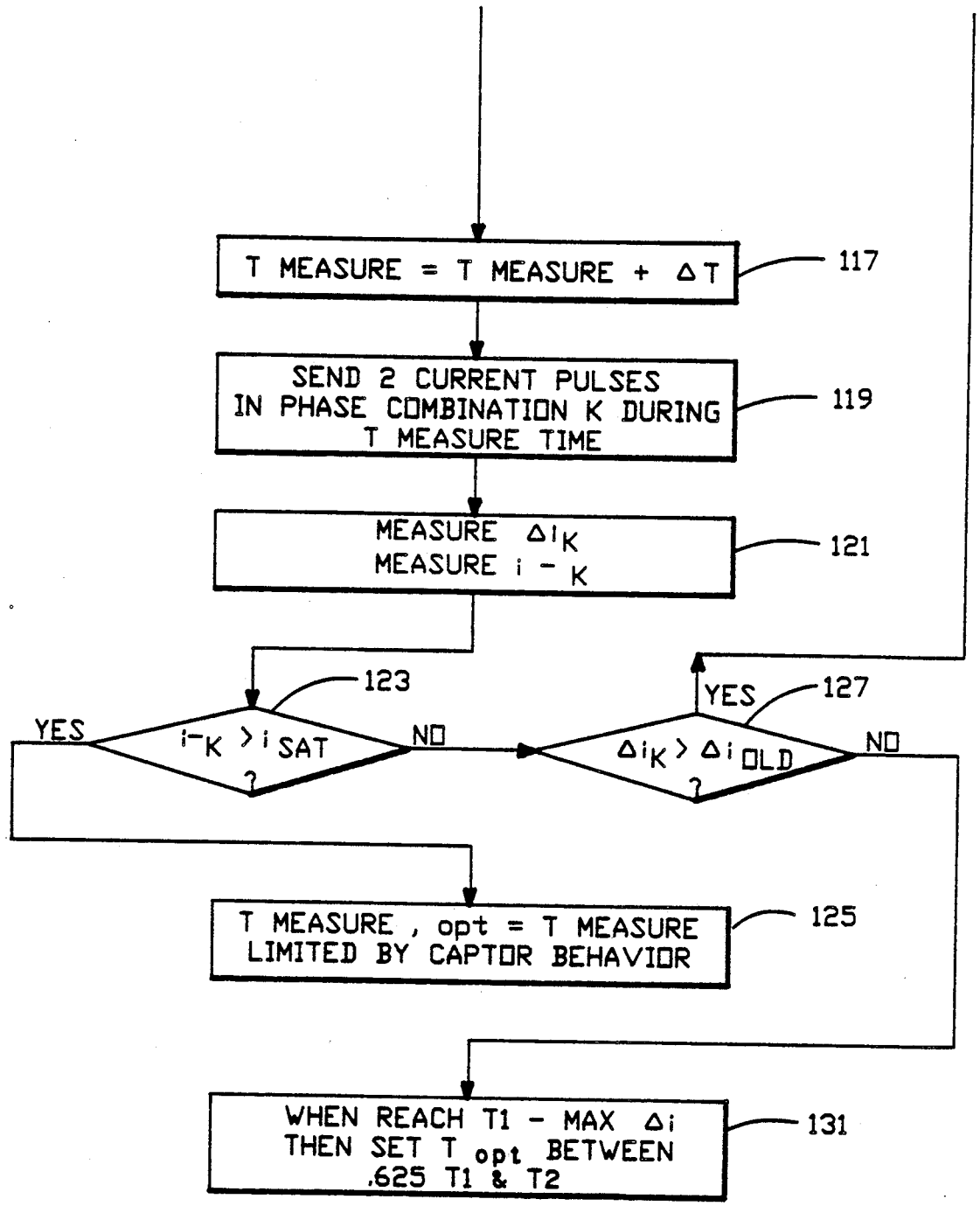

To accomplish the learning phase, the motor control circuitry follows the algorithm presented as a flow chart in FIG. 14. The initial step initializes the variables $T_{measure}$ to $T_{min}$, the measuring time T corresponding to $\Delta i_{min}$, k to m+1, where m is the number of phases, and ∆i to zero. Step 101 a variable $k_{old}$ is equated to the preset variable k. Steps 107 and 109 accomplish the phase pulsing in the same manner as when a position location is desired to be measured. However, in this instance, the current pulse durations are equal to $T_{measure}$ which had previously been set to $T_{min}$. This initial measurement is probably inaccurate. If all of the signs of the current differences are equal, then definitely the measurement is inaccurate. This is checked in step 111 and if its found to be true, the measuring time is incremented by a fixed value at step 105. The current difference determination is then repeated.

If the signs of the current differences are not equal, step 113 determines which phase is different. The number of this different phase replaces the initial k value set in step 101. Step 115 compares the $k_{old}$ to k. During the first pass through the algorithm, this step will necessarily produce a "no" answer. The algorithm will reset to step 103 and begin again. However, k will now equal the different phase and on the second pass, unless the rotor has moved, the answer to the query in step 115 will be "yes".

At step 117, $T_{measure}$ is incremented by ∆T producing a longer current pulse. This pulse is applied, once as a positive pulse and again as a negative pulse, to the phase combination represented by the value of k determined in step 113. The magnitude of the negative pulse $i^-{}_k$ and the magnitude of the current difference $\Delta i_k$ are determined in step 121. The magnitude of the negative pulse is compared to a preset maximum current value $i_{sat}$. If the measuring current exceeds this value, the current duration of $T_{measure}$ is considered the optimum value.

However, if the saturation value is not exceeded, the algorithm continues to optimize $T_{measure}$. The value of $\Delta i_k$ is compared to the previous value. If the current value is larger, which it necessarily is on the first pass, the old value will be replaced with the current value in step 129 and the cycle will be repeated. As $T_{measure}$ is successively increased, the value of the current difference will increase as depicted in FIG. 6 until the duration T exceeds $\Delta i_{max}$. After this point, the next current difference measurement will be less than the previous value. Thus a "no" answer will occur at the step 127 query.

At this point in the algorithm, the value of $T_{measure}$ is equal to the value of $T_1$ in FIG. 6. From the previously derived figure of merit analysis, it is known that the optimum value of T is less than $T_1$. Computer simulations of the figure of merit calculations have shown that the optimum value of T for a variety of phase time constants averages about 0.647 of the maximum value $T_1$. However, to simplify microprocessor implementation a value of 0.625 is used. Thus, the optimum value of $T_{measure}$ is determined to be between 0.625 of $T_1$ and $T_1$.

Continuing with the preferred embodiment example of FIG. 13, the same phase that was previously energized with a positive current of duration T is now energized using a negative current through driver 12, and the resulting current converted to a voltage at converter 16 and through switch 18 stored at peak detector 22. The two peak current values are compared at comparator 24, with the difference in magnitude not being established, but only the sign of the magnitude. The sign of the current difference is routed via switch 26 to a memory 28.

The above procedure is repeated for each other phase or set of phases. In the case of a three-phase motor, this means that three signs are determined at comparator 24, with the second result being stored in memory 30 and the third result at memory 32. Based on the signs of the current differences obtained as described above, and using a look-up table shown below, a state selection of the phase or phases to be energized in order to start the motor moving in a chosen direction is determined 34.

Figure 15:
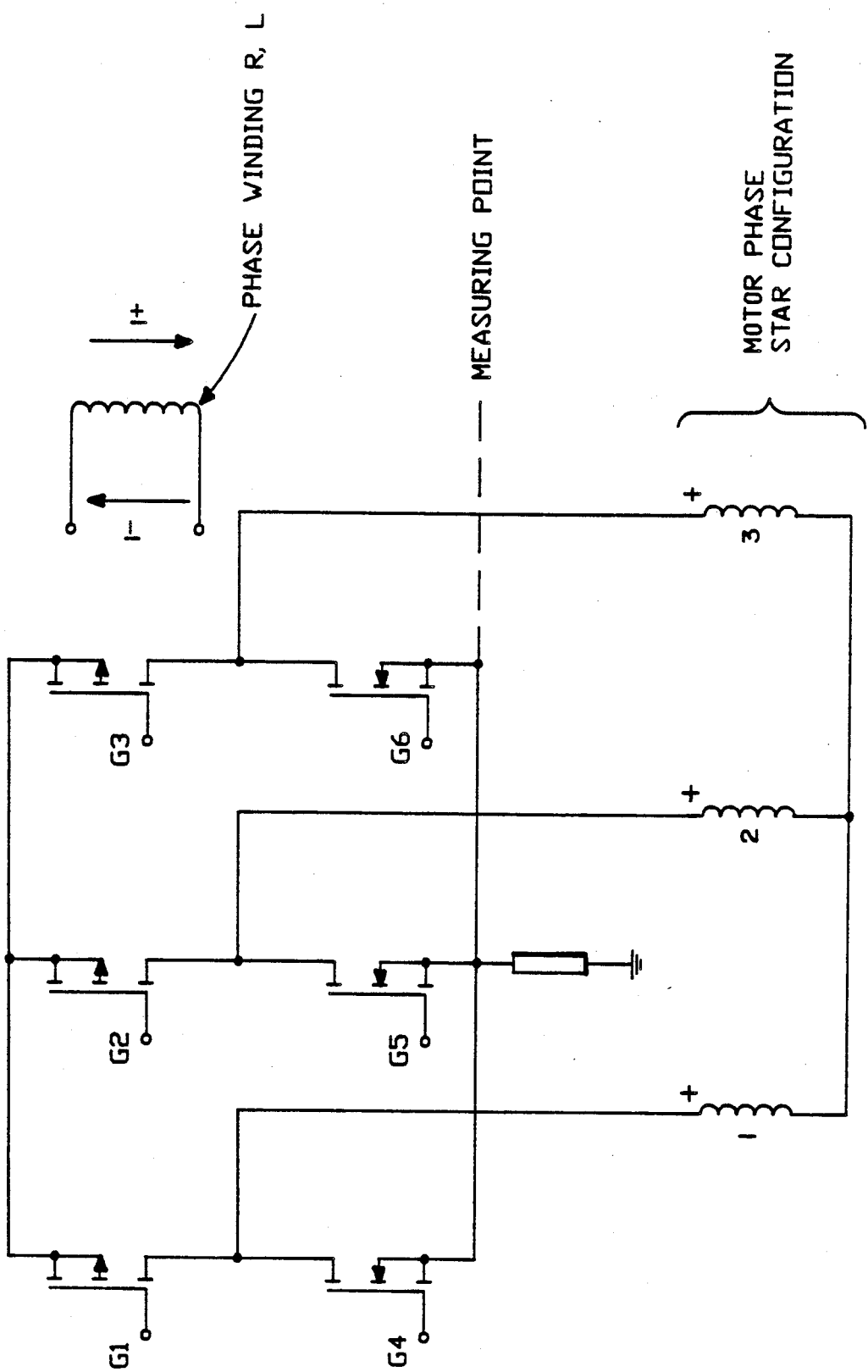
FIG. 15 is a detailed schematic of the motor energization according to the present invention.
Figure 16:
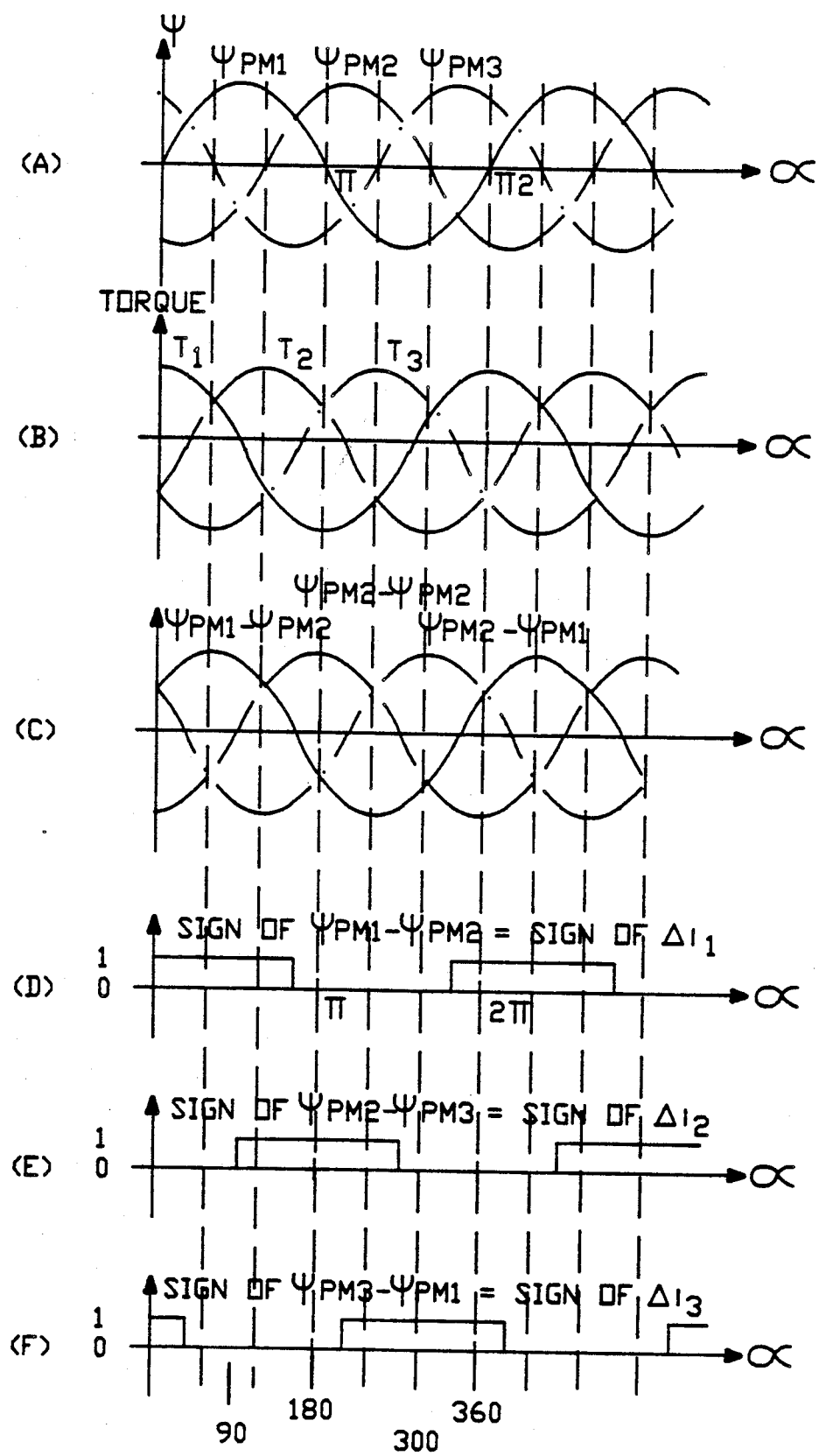
FIG. 16 illustrates flux distribution versus torque versus the sign of the resulting current difference in a motor being energized to determine motor position according to the present invention.

This last part of the method, that is selection of the phases to be energized in order to start the motor in the chosen direction, can be explained with respect to FIGS. 15 and 16.

Considering, for example, a star configuration of the phases as illustrated in FIG. 15, the measurement of the current difference is made when two phases in series are energized for each possible configuration. These configurations are Phase 1 and Phase 2 in series; Phase 1 and Phase 3 in series; and Phase 2 and Phase 3 in series. Referring to this FIG. 13, the first combination of Phase 1 and Phase 2 is energized to cause a current to pass therethrough by turning on transistors G1 and G5, causing the current to pass from G1 through Phase 1 to Phase 2 and through the resistor R6 to ground, with the current being measured at the point A.

These transistors are switched off, and a current in the opposite direction is caused to pass through the same series pair of phases by turning on transistors G2, G4 with the current being measured at the same point. The difference in the currents is then determined either by subtraction of the values, or by first integration and then determination of the difference, or differentiation and determination of the difference, all as explained as above. The difference is stored as a one or zero representing positive or negative. The convention to be adopted in explaining this specific example is that if the signs of the current difference is positive, the function will be considered equal to one; if the sign of the current difference is negative, then the function is considered equal to zero. The remaining current differences for the phase configuration are measured by appropriate switching of the transistor G1–G6.

Referring next to FIG. 16, it represents the flux distribution and the corresponding torque which can be created. Thus, the top line, Line A, represents the different excitation flux in the phases, $\Psi_{PM1}$, $\Psi_{PM2}$, $\Psi_{PM3}$, versus the motor rotor position. The second line, Line B, represents the different phase torques, T1, T2, T3, and thereby illustrates the static torque which can be created. The third line, line C, shows the flux differences, the first difference $\Psi_{PM1} - \Psi_{PM2}$, the second difference $\Psi_{PM2} - \Psi_{PM3}$, the third difference $\Psi_{PM3} - \Psi_{PM1}$. The fourth line, Line D, represents the current difference sign $\Delta i_1$. The fifth line, Line E, represents the current difference sign $\Delta i_2$. The sixth line, Line F, represents the current difference sign $\Delta i_3$.

The torque is then determined as follows:

$$T1 = \frac{d\Psi_{PM1}}{d\alpha} \cdot \frac{d\alpha}{dt} \cdot i1$$

$$T2 = \frac{d\Psi_{PM2}}{d\alpha} \cdot \frac{d\alpha}{dt} \cdot i2$$

-continued $$T3 = \frac{d\Psi_{PM3}}{d\alpha} \cdot \frac{d\alpha}{dt} \cdot i3$$

The determination of the first switching sequence based on the measurement of the sign of the current differences is based on the following:

sign of $\Delta i_1$ = sign of $\Psi_{PM1} - \Psi_{PM2}$
sign of $\Delta i_2$ = sign of $\Psi_{PM2} - \Psi_{PM3}$  } Two phases in series
sign of $\Delta i_3$ = sign of $\Psi_{PM3} - \Psi_{PM1}$ In order to obtain a positive torque, the following state function can be defined:

$i_K$ energized positively = state function of $i_K = 1$
$i_K$ energized negatively = state function of $i_K = 0$ with K = 1, 2, 3

Then the following table gives the first switching sequence:

| Electrical Degree | Sign of | | | State Function of | | |
|---|---|---|---|---|---|---|
| | $\Delta i1$ | $\Delta i2$ | $\Delta i3$ | i1 | i2 | i3 |
| 0–30 | 1 | 0 | 1 | 1 | 0 | 0 |
| 30–90 | 1 | 0 | 0 | 1 | 1 | 0 |
| 90–150 | 1 | 1 | 0 | 0 | 1 | 0 |
| 150–210 | 0 | 1 | 0 | 0 | 1 | 1 |
| 210–270 | 0 | 1 | 1 | 0 | 0 | 1 |
| 270–330 | 0 | 0 | 1 | 1 | 0 | 1 |
| 330–360 | 1 | 0 | 1 | 1 | 0 | 0 |
| with: state function | i1 = $\overline{\Delta i2}$ | | | | | |
| | i2 = $\overline{\Delta i3}$ | | | | | |
| | i3 = $\overline{\Delta i1}$ | | | | | |

This defines how to start the motor in motion in the proper direction. That is, based on the sign of the current difference as shown in the first three columns of the table, then the currents must be applied to the phases of the motor as shown in the last three columns under the heading "State Function" in order to create the torque to start the motor in the right direction. This table is also reflected in lines D, E and F of FIG. 16, which illustrate the pattern with which the sign of the current difference change with differing positions of the rotor. Once the table is established by defining the set of signs (represented by ones and zeros), then the proper current to be applied to the different phases to start in the desired direction will be known.

Other alternatives may become apparent to a person of skill in the art who studies the invention disclosure. For example, consider a three-phase brushless DC motor connected in a star configuration with a center tap as shown in FIG. 17A. The following possible approaches may be taken to detect the position at standstill. The first possibility, shown schematically in FIG. 17B, determines the sign of the current difference (*) as measured between pairs of phases. This is the approach described in detail above.

In the second possible approach, FIG. 17C, currents run in opposite directions through one phase at a time. The current difference (*) is measured between each phase and the center tap.

In a third possible approach (FIG. 17D), a combination of phases is formed comprising a phase connected in series with the two other phases connected in parallel. The current difference (*) is then measured as indicated between the phase combination and the center tap.

Another approach is to combine the results achieved from the methods of FIG. 17B and FIG. 17C. This detects position with an accuracy of $\tau/2$ m, approximately doubling the accuracy of the methods described above. Thus, the scope of the invention is limited only by the following claims.

What is claimed is:

1. A commutatorless direct current motor comprising:
   a plurality of stator windings connected to define m phases of said motor;
   a permanent magnet or DC current excitation winding positioned relative to said stator windings and rotatable relative to said stator windings and comprising means for establishing first, fixed magnetic fields;
   driver means connected to said plurality of stator windings for applying short term current pulses to energize at least one phase thereof for inducing at least one second, controlled magnetic field, and thereby inducing currents in said stator windings;
   monitoring means for detecting each said current established by said applied current pulses, each said current representing the interaction of said first, fixed magnetic field and each of said second, current pulse induced magnetic field;
   detection means for identifying the magnitude of the difference between the currents produced in response to said pulses; and
   optimization means cooperating with said detection means for optimizing duration of each of said short term current pulses.

2. The motor of claim 1 wherein said monitoring means detects the peak voltage at a current voltage converter coupled to said energized phase obtained in response to the application of each current pulse to each said stator windings.

3. The motor of claim 1 wherein said detection means includes means for identifying a rotational position of said magnet relative to said stator windings based on the sign of the difference between the response to said current pulses.

4. The motor of claim 1 wherein said monitoring means includes means for integrating the current response to each said applied current pulse, said detection means including means for determining a rotational position of said magnet based on the sign of the difference in the integrals.

5. The motor of claim 1 wherein said monitoring means includes means for differentiating the current response to each said applied current pulse, said detection means including means for determining a rotational position of said magnet based on the sign of the difference in the differentials.

6. The motor of claim 1 wherein said driver means comprise means for applying current, first of one polarity and then of an opposite polarity, to said motor phases.

7. The motor of claim 1 wherein said optimizing means detects a maximum current pulse duration necessary to maximize the magnitude of said current difference and determines an optimum short term current pulse duration as a fraction of said maximum current pulse duration.

8. The motor of claim 7 wherein said optimum current pulse duration is between 0.625 and 1 times said maximum current pulse duration.

9. In a brushless DC motor having multiple windings arranged as a stator and a permanent magnet rotor or a DC current excitation winding, apparatus for controlling ordered application of electrical current to the stator windings and measuring the response thereto comprising;
   circuit means coupled to the stator windings for selectively establishing current paths through selected stator windings in response to control signals;
   driver means for applying short duration current pulses of first and second opposite polarities to energize each said selected stator winding;
   monitoring means for detecting the voltage detected at a current-voltage converter connected to the energized stator winding by each of said applied current pulses of opposite polarities;
   detection means for identifying the magnitude of the difference between the currents produced in response to said pulses applied to said selected stator winding; and
   optimization means cooperating with said detection means for optimizing duration of each of said short duration current pulses.

10. The motor of claim 9 wherein said stator windings are ordered in phases and said driver means apply current pulses, first of one polarity and then of the opposite polarity, to the same one of said phases, said monitoring means detecting the output of the current-voltage converter established in response to said applied current pulses.

11. The motor of claim 9 wherein said monitoring means includes means for integrating the current response to each said applied current pulse, said detection means including means for determining a rotational position of said magnet based on the sign of the difference in the integrals.

12. The motor of claim 9 wherein said monitoring means includes means for differentiating the current response to each said applied current pulse, said detection means including means for determining a rotational position of said magnet based on the sign of the difference in the differentials.

13. The motor of claim 9 wherein said stator windings are arranged in three phases, said phases being selectively connected in pairs so that the current pulses are applied with alternating polarities to each pair of the plurality of pairs.

14. The brushless DC motor of claim 9 wherein said detection means includes means for identifying a rotational position of said magnet relative to said stator windings based on the sign of the difference between the response to said pulses.

15. The brushless DC motor of claim 14 wherein said optimization means detects a maximum current pulse duration necessary to maximize the magnitude of said current difference and determines an optimum short term current pulse duration as a fraction of said maximum current pulse duration.

16. The brushless DC motor of claim 15 wherein said optimum current pulse duration is between 0.625 and 1 times said maximum current pulse duration.

17. A commutatorless direct current motor comprising:

a plurality of stator windings connected to define m phases of said motor;

a permanent magnet or DC current excitation winding positioned relative to said stator windings and rotatable relative to said stator windings and comprising means for establishing first, fixed magnetic fields;

driver means connected to said plurality of stator windings for applying short term current pulses of opposite polarity separately to energize at least two different phases thereof for inducing at least two second, controlled magnetic fields, and thereby inducing currents in said stator windings;

monitoring means for detecting each said current established by said applied current pulses, each said current representing the interaction of said first, fixed magnetic field and each of said second, current pulse induced magnetic field;

detection means for identifying the magnitude of the difference between the currents produced in response to said pulses; and optimization means cooperating with said detection means for optimizing duration of each of said short term current pulses.

18. The motor of claim 17 wherein said monitoring means detects the peak voltage at a current voltage converter coupled to said energized phase obtained in response to the application of each current pulse to each said phase of stator windings.

19. The motor of claim 17 wherein said detection means includes means for identifying a rotational position of said magnet relative to said stator windings based on the sign of the difference between the response to said pulses.

20. The motor of claim 17 wherein said monitoring means includes means for integrating the current response to each said applied current pulse, said detection means including means for determining a rotational position of said magnet based on the sign of the difference in the integrals.

21. The motor of claim 17 wherein said monitoring means includes means for differentiating the current response to each said applied current pulse, said detection means including means for determining a rotational position of said magnet based on the sign of the difference in the differentials.

22. The motor of claim 21 wherein said optimization means detects a maximum current pulse duration necessary to maximize the magnitude of said current difference and determines an optimum short term current pulse duration as a fraction of said maximum current pulse duration.

23. The motor of claim 22 wherein said optimum current pulse duration is between 0.625 and 1 times said maximum current pulse duration.

24. A commutatorless direct current motor comprising:

a plurality of stator windings connected to define m phases of said motor;

a permanent magnet or DC current excitation winding positioned relative to said stator windings and rotatable relative to said stator windings and comprising means for establishing first, fixed magnetic fields;

driver means connected to said plurality, of stator windings for applying short term current pulses to energize at least two different combinations of phases thereof comprising at least one phase connected in series with at least a pair of phases connected in parallel, for inducing at least two second, controlled magnetic fields, and thereby inducing currents in said stator windings;

monitoring means for detecting each said current established by said applied current pulses, each said current representing the interaction of said first, fixed magnetic field and each of said second, current pulse induced magnetic field;

detection means for identifying the magnitude of the difference between the currents produced in response to said pulses; and optimization means cooperating with said detection means for optimizing duration of each of said short term current pulses.

25. The motor of claim 24 wherein said monitoring means detects the peak voltage at a current voltage converter coupled to said energized phase obtained in response to the application of each current pulse to each said phase combination of windings.

26. The motor of claim 24 wherein said detection means includes means for identifying a rotational position of said magnet relative to said stator windings based on the sign of the difference between the response to said pulses.

27. The motor of claim 24 wherein said monitoring means includes means for integrating the current response to each said applied current pulse, said detection means including means for determining a rotational position of said magnet based on the sign of the difference in the integrals.

28. The motor of claim 24 wherein said monitoring means includes means for differentiating the current response to each said applied current pulse, said detection means including means for determining a rotational position of said magnet based on the sign of the difference in the differentials.

29. The motor of claim 28 wherein said optimization means detects a maximum current pulse duration necessary to maximize the magnitude of said current difference and determines an optimum current pulse duration as a fraction of said maximum current pulse duration.

30. The motor of claim 29 wherein said optimum current pulse duration is between 0.625 and 1 times said maximum current pulse duration.

31. In a brushless DC motor having multiple windings arranged as a stator and a permanent magnet rotor or a DC current excitation winding, a method for controlling ordered application of electrical current to the stator windings and measuring the response thereto to determine the initial position of said rotor comprising the steps of coupling circuit means to the stator windings for selectively establishing current paths through a selected stator winding or windings in response to control signals, applying short duration current pulses of first and second opposite polarities to energize each said selected stator winding, detecting the voltage detected at a current-voltage converter connected to the energized winding by each of said applied current pulses of opposite polarities, identifying the magnitude of the difference between the currents produced in response to said pulses applied to said selected stator winding, and optimizing the duration of each of said short duration current pulses.

32. The motor of claim 31 wherein said stator windings are ordered in phases and said applied current pulses are first of one polarity and then of the opposite polarity to the same one of said phases, said detecting step monitoring the output of the current-voltage converter established in response to said applied current pulses.

33. The motor of claim 31 wherein said detecting step includes identifying a rotational position of said rotor magnet relative to said stator windings based on the sign of the difference between the response to said pulses.

34. The motor of claim 31 wherein said detecting step includes integrating the current response to each said applied current pulse, and determining a rotational position of said rotor magnet based on the sign of the difference in the integrals.

35. The motor of claim 31 wherein said detecting step includes differentiating the current response to each said applied current pulse, and determining a rotational position of said rotor magnet based on the sign of the difference in the differentials.

36. The brushless DC motor of claim 31 wherein said stator windings are arranged in three phases, said phases being selectively connected in pairs so that the current pulses are applied with alternating polarities to each pair of the plurality of pairs.

37. The motor of claim 31 wherein said short duration current pulses are applied to series connected stator windings.

38. The motor of claim 31 wherein said short duration current pulses are applied to sets of said stator windings comprising a winding connected in series with a pair of windings connected in parallel.

39. The motor of claim 31 wherein said magnitude of the difference between the currents produced in response to said pulses is determined based on first applying selected current pulses to each individual winding of said stator windings, and thereafter to each potential series connected pair of windings.

40. The motor of claim 31 wherein said optimizing step includes determining an optimum duration of said short duration current pulses comprising measuring a maximum current pulse duration necessary to maximize the magnitude of said current difference and determining the optimum current pulse duration as a fraction of said maximum current pulse duration.

41. The motor of claim 40 wherein said step determining said optimum current pulse duration is accomplished by multiplying said maximum current pulse duration by a fraction between 0.625 and 1.

* * * * *